United States Patent
Byun et al.

(10) Patent No.: US 11,305,750 B2
(45) Date of Patent: Apr. 19, 2022

(54) METHOD AND SYSTEM FOR CONTROLLING STARTING OF MILD HYBRID ELECTRIC VEHICLE

(71) Applicants: Hyundai Motor Company, Seoul (KR); Kia Motors Corporation, Seoul (KR)

(72) Inventors: Jungsup Byun, Gyeonggi-do (KR); Seungwoo Lee, Seoul (KR); Minkyu Han, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 238 days.

(21) Appl. No.: 16/513,247

(22) Filed: Jul. 16, 2019

(65) Prior Publication Data
US 2020/0317185 A1   Oct. 8, 2020

(30) Foreign Application Priority Data
Apr. 3, 2019 (KR) .................. 10-2019-0039021

(51) Int. Cl.
| | |
|---|---|
| *B60L 9/00* | (2019.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2019.01) |
| *B60W 20/00* | (2016.01) |
| *B60K 6/26* | (2007.10) |
| *F02D 41/06* | (2006.01) |

(52) U.S. Cl.
CPC ............... *B60W 20/00* (2013.01); *B60K 6/26* (2013.01); *F02D 41/061* (2013.01); *F02D 41/064* (2013.01); *B60K 2006/268* (2013.01); *B60W 2510/0638* (2013.01); *B60W 2510/0676* (2013.01); *B60W 2510/244* (2013.01); *B60W 2510/246* (2013.01); *B60W 2520/10* (2013.01); *B60W 2540/10* (2013.01); *B60W 2710/0616* (2013.01)

(58) Field of Classification Search
CPC ......... B60W 20/00; B60W 2510/0638; B60W 2510/0676; B60W 2510/244; B60W 2510/246; B60W 2520/10; B60W 2540/10; B60W 2710/0616; B60K 6/26; B60K 2006/268; F02D 41/064; F02D 41/061
USPC ........................................................ 701/22
See application file for complete search history.

(56) References Cited

U.S. PATENT DOCUMENTS 5,441,030 A * 8/1995 Satsukawa ............ F02D 41/061
                                                         123/478
10,385,815 B1 * 8/2019 Dudar ................... B60W 10/06
(Continued)

*Primary Examiner* — Mahmoud S Ismail
(74) *Attorney, Agent, or Firm* — Mintz Levin Cohn Ferris Glovsky and Popeo, P.C.; Peter F. Corless

(57) ABSTRACT

A method for controlling starting of a mild hybrid vehicle includes receiving a starting-request signal and in response, increasing a rotation speed of the engine by driving the MHSG by electricity supplied from a battery. Status data of the mild hybrid vehicle for controlling starting of the engine is monitored to obtain an engine rotation speed from the status data and determine an injection-starting rotation speed based on the status data. When the engine rotation speed is greater than the injection-starting rotation speed, fuel injection of the engine is started.

10 Claims, 3 Drawing Sheets

(56) References Cited

U.S. PATENT DOCUMENTS

| | | | | |
|---|---|---|---|---|
| 2002/0011238 A1* | 1/2002 | Yomogida | ............. | F02D 41/064 |
| | | | | 123/491 |
| 2006/0100056 A1* | 5/2006 | Yamauchi | .............. | B60K 6/445 |
| | | | | 477/3 |
| 2008/0277176 A1* | 11/2008 | Akimoto | ............... | B60W 10/04 |
| | | | | 180/65.28 |
| 2008/0296908 A1* | 12/2008 | Utsumi | ................... | F02D 29/02 |
| | | | | 290/40 C |
| 2016/0312724 A1* | 10/2016 | Sagayama | ............... | F02B 63/04 |
| 2019/0283730 A1* | 9/2019 | Ota | ....................... | B60W 10/26 |

* cited by examiner

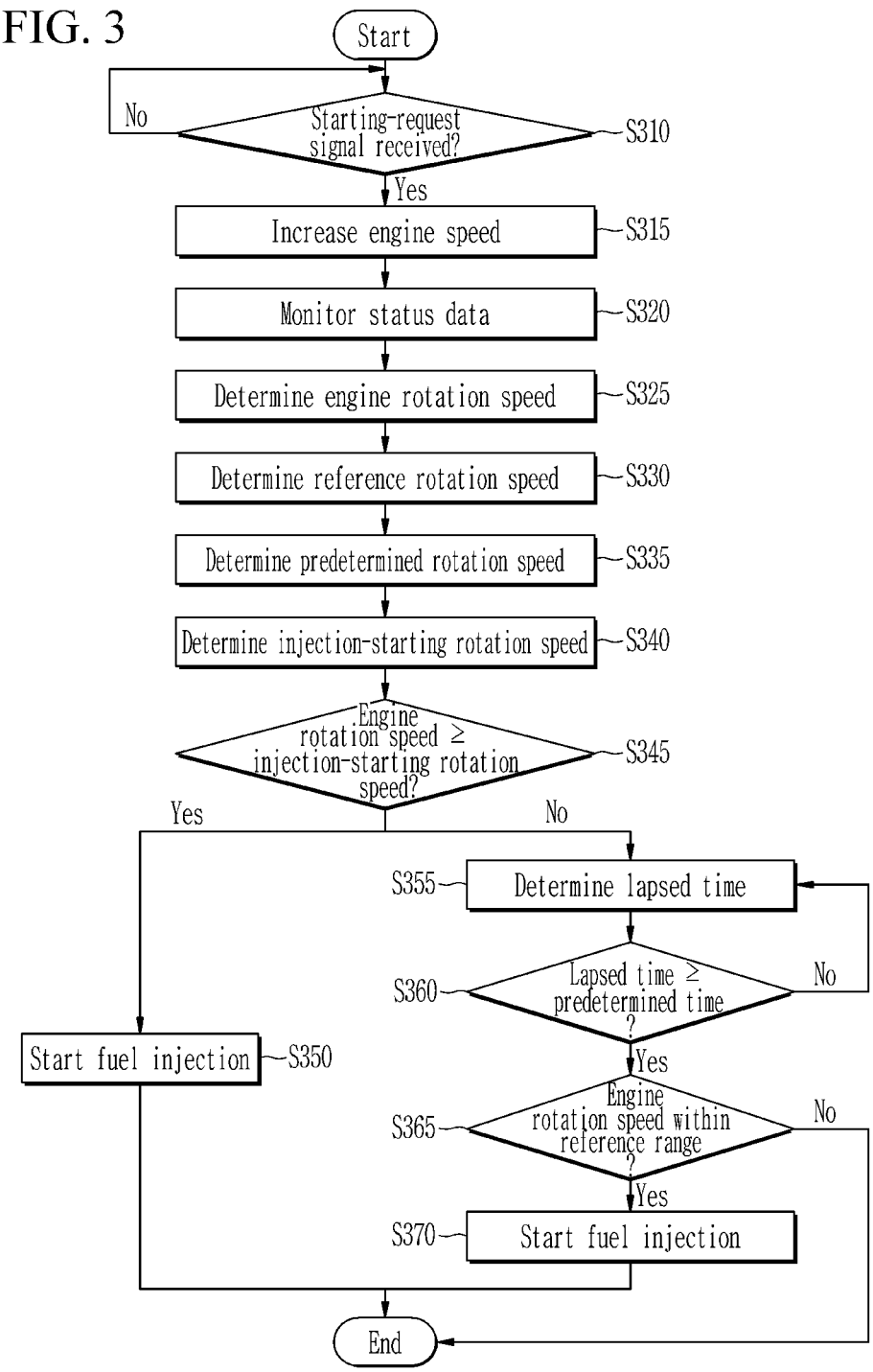

METHOD AND SYSTEM FOR CONTROLLING STARTING OF MILD HYBRID ELECTRIC VEHICLE

CROSS-REFERENCE TO RELATED APPLICATION

This application claims priority to and the benefit of Korean Patent Application No. 10-2019-0039021 filed on Apr. 3, 2019, the entire contents of which are incorporated herein by reference.

BACKGROUND

(a) Field of the Invention

The present invention relates to a method and system for controlling starting of a mild hybrid vehicle, and more particularly, to a method and system for controlling starting of a mild hybrid vehicle using a mild hybrid integrated starter-generator (MHSG) to control timing of fuel injection at starting of an engine.

(b) Description of the Related Art

A hybrid vehicle includes an engine and a drive motor as power sources, and is driven by a combination of a drive torque generated by combustion of the engine and a drive torque generated by the drive motor by electrical energy retrieved from a battery. A hybrid vehicle may be classified as a mild type and a hard type.

In particular, a hard typed hybrid vehicle includes an integrated starter-generator to start an engine and/or to generate electricity by the output torque of the engine, and additionally includes a drive motor to drive the vehicle. A mild typed hybrid vehicle (hereinafter called a mild hybrid vehicle) utilizes a battery and a drive motor of lower capacities relative to a hard type hybrid vehicle. In other words, a mild hybrid vehicle includes a mild hybrid integrated starter-generator (hereinafter, MHSG) replacing an alternator of a conventional internal combustion engine vehicle.

Although such a mild hybrid vehicle may not be driven solely by the torque of the MHSG, the torque of the drive motor may be additively utilized to the torque of the engine, and the MHSG may generate electricity during a regenerative braking to charge a battery (e.g., 48V battery). Accordingly, a mild hybrid vehicle may show improved fuel consumption characteristic. Conventionally, to start an engine in such a mild hybrid vehicle by the MHSG, fuel is injected as soon as cranking and cylinders are identified.

The above information disclosed in this section is merely for enhancement of understanding of the background of the invention and therefore it may contain information that does not form the prior art that is already known in this country to a person of ordinary skill in the art.

SUMMARY

The present invention provides a method and system for controlling starting of a mild hybrid vehicle using an MHSG to control timing of fuel injection at starting of an engine. According to an exemplary embodiment of the present invention, to start the engine, an MHSG may be firstly driven to increase a rotation speed of the engine above a certain level, and then fuel injection may be started.

An exemplary method for controlling starting of a mild hybrid vehicle may include receiving a starting-request signal, increasing a rotation speed of the engine by operating the MHSG by electricity supplied from a battery, in response to receiving the starting-request signal, monitoring status data of the mild hybrid vehicle for controlling starting of the engine, obtaining an engine rotation speed from the status data, determining an injection-starting rotation speed based on the status data, determining whether the engine rotation speed is greater than the injection-starting rotation speed, and staring fuel injection of the engine when the engine rotation speed is greater than the injection-starting rotation speed. According to an exemplary embodiment of the present invention, fuel consumption may be reduced and fuel economy may be improved for starting of an engine, by firstly using an MHSG to increase a rotation speed of the engine and then starting fuel injection.

Other effects that may be obtained or are predicted by an exemplary embodiment of the present invention will be explicitly or implicitly described in a detailed description of the present invention. That is, various effects that are predicted according to an exemplary embodiment of the present invention will be described in the following detailed description.

BRIEF DESCRIPTION OF THE DRAWINGS

These and/or other aspects of the invention will become apparent and more readily appreciated from the following description of the exemplary embodiments, taken in conjunction with the accompanying drawings of which:

FIG. 3 is a flowchart for a method for controlling starting of a mild hybrid vehicle according to an exemplary embodiment of the present invention.

DETAILED DESCRIPTION

Figure 1:
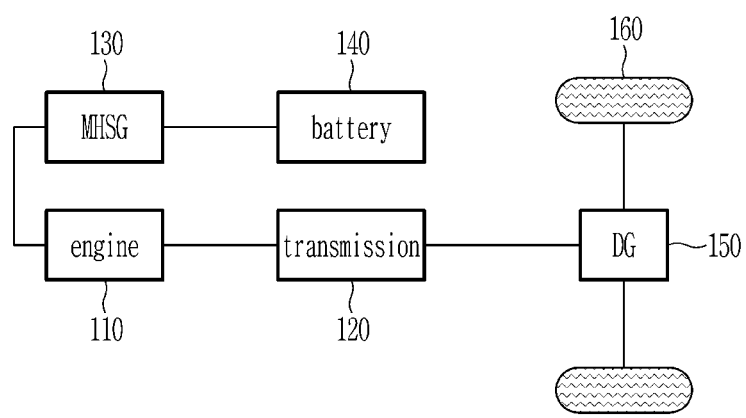
FIG. 1 is a block diagram illustrating a mild hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an apparatus and a method for controlling starting of a mild hybrid vehicle according to an exemplary embodiment of the present invention is described in detail with reference to the drawings. However, the drawings to be described below and the following detailed description relate to one preferred exemplary embodiment of various exemplary embodiments for effectively explaining the characteristics of the present invention. Therefore, the present invention should not be construed as being limited to the drawings and the following description.

Further, in the description of exemplary embodiments of the present invention, the detailed description of related well-known configurations and functions is not provided when it is determined as unnecessarily making the scope of the present invention unclear. In addition, the terminologies to be described below are ones defined in consideration of their function in an exemplary embodiment of the present invention and may be changed by the intention of a user, an operator, or a custom. Therefore, their definition should be made on the basis of the description of the present invention.

Further, in the following exemplary embodiments, the terminologies are appropriately changed, combined, or divided so that those skilled in the art can clearly understand them, in order to efficiently explain the main technical characteristics of the present invention, but the present invention is not limited thereto.

Hereinafter, exemplary embodiments of the present invention will be described in detail with reference to the accompanying drawings.

FIG. 1 is a block diagram illustrating a mild hybrid vehicle according to an exemplary embodiment of the present invention. Referring to FIG. 1, a mild hybrid vehicle may include an engine 110, a transmission 120, a mild hybrid integrated starter-generator (MHSG) 130, a battery 140, a differential gear apparatus 150, and a drive-wheel 160.

The engine 110 may be configured to generate a drive torque by combustion of a fuel. In other words, the engine 110 may be configured to transform a chemical energy of the fuel to a mechanical energy, by combustion of the fuel with the air. The engine 110 may be utilized in a various type of engines, such as a gasoline engine, a diesel engine, a liquefied petroleum injection (LPI) engine, etc. The torque of the engine 110 may be transmitted to an input shaft of the transmission 120, and an output torque of the transmission 120 may be delivered to the drive wheel 160 through the differential gear apparatus 150. Thus, the mild hybrid vehicle may be driven by rotating the drive-wheel 160 by the torque delivery of the engine 110.

The transmission 120 may be any type of transmissions, e.g., an automatic transmission or a manual transmission. The MHSG 130 may be configured to convert an electrical energy to a mechanical energy, or a mechanical energy to an electrical energy. In other words, the MHSG 130 may be configured to start the engine 110 by operating as a motor driven by electricity, or generate electricity by operating as a generator driven by a torque of the engine 110. In addition, the torque of the MHSG 130 may additively utilized with the torque of the engine 110. In other words, the mild hybrid vehicle may use the engine 110 as a primary power source, while using the MHSG 130 as an auxiliary power source.

The battery 140 may be configured to supply an electricity to the MHSG 130, or may be recharged by electricity supplied form the MHSG 130. The battery 140 may be a high voltage battery (e.g., 48V battery 140), e.g., a lithium-ion battery. The mild hybrid vehicle may further include a low voltage direct current-direct current (DC-DC) converter (LDC), to convert the voltage of the battery 140 to a low voltage, and a low voltage battery (e.g., 12V battery) configured to supply a low voltage to electrical devices within the vehicle (e.g., headlamp, air conditioner, etc.) using the low voltage.

Figure 2:
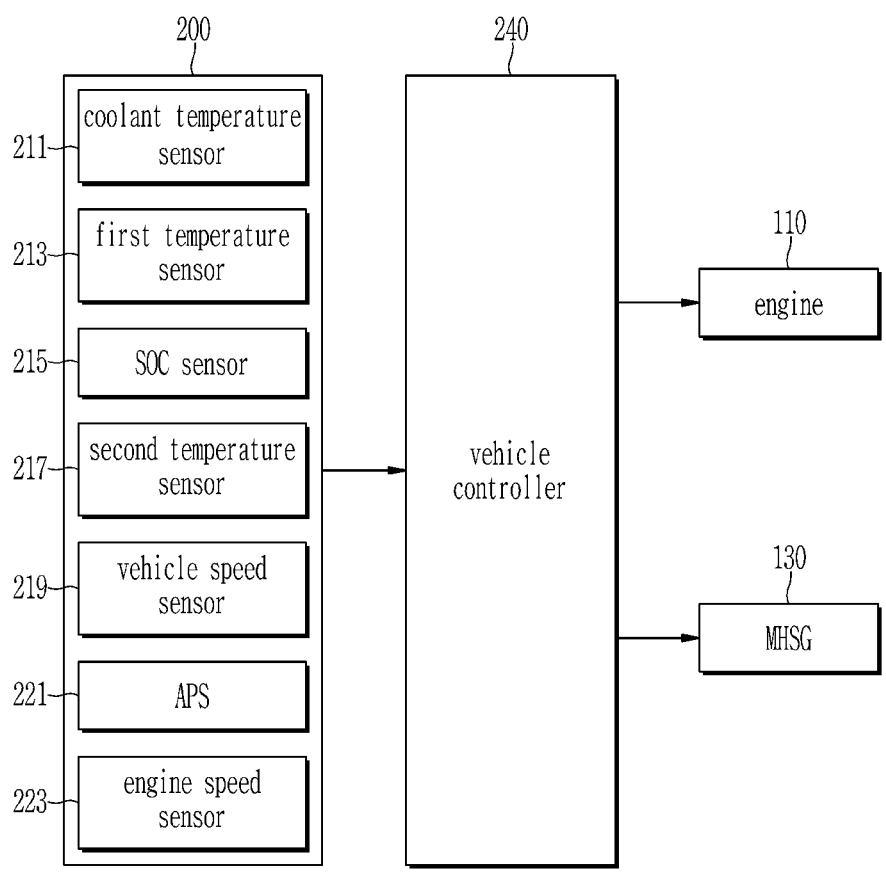
FIG. 2 is a block diagram of an apparatus for controlling starting of a mild hybrid vehicle according to an exemplary embodiment of the present invention.

FIG. 2 is a block diagram of an apparatus for controlling starting of a mild hybrid vehicle according to an exemplary embodiment of the present invention. Referring to FIG. 2, an apparatus for controlling starting of a mild hybrid vehicle may include a data detection unit 200 and a vehicle controller 240.

In particular, the data detection unit 200 may be configured to detect status data to control starting of the mild hybrid vehicle. The data detection unit 200 may include a coolant temperature sensor 211, a first temperature sensor 213, a state-of-charge (SOC) sensor 215, a second temperature sensor 217, a vehicle speed sensor 219, an accelerator pedal position sensor (APS) 221, and an engine speed sensor 223. The data detection unit 200 may further include detection devices configured to operate the mild hybrid vehicle, e.g., a brake pedal position detector, ambient temperature sensor.

The coolant temperature sensor 211 may be configured to detect a temperature of a coolant for cooling the engine 110, and provide or transmit the detected coolant temperature to the vehicle controller 240. The coolant temperature sensor 211 may be installed at an appropriate location, such as at a cylinder head and/or in a coolant line. The first temperature sensor 213 may be configured to detect a temperature of the battery 140, and provide or transmit the detected temperature of the battery 140 to the vehicle controller 240. The state of charge (SOC) sensor may be configured to detect an SOC of the battery 140, and provide or transmit the detected SOC of the battery 140 to the vehicle controller 240.

Alternatively, instead of directly detecting the SOC of the battery 140, the SOC sensor may be configured to measure current and voltage of the battery 140 and provide the measured current and voltage to the vehicle controller 240. In particular, the vehicle controller 240 may be configured to estimate the SOC of the battery 140 based on the measured current and voltage of the battery 140 measured by the SOC sensor. The second temperature sensor 217 may be configured to detect a temperature of the MHSG 130. The second temperature sensor 217 may then be configured to provide or transmit the detected temperature of the MHSG 130 to the vehicle controller 240.

Additionally, the vehicle speed sensor 219 may be configured to detect a vehicle speed of the mild hybrid vehicle, and provide or transmit the detected vehicle speed to the vehicle controller 240. The vehicle speed sensor 219 may be installed at an appropriate location of the mild hybrid vehicle, e.g., at the drive-wheel 160 or at the differential gear apparatus 150. The acceleration pedal sensor (APS) 221 may be configured to detect an amount of depression (e.g., engagement amount) of an accelerator pedal operated by a driver. In other words, the APS 221 may be configured to measure a position value of the accelerator pedal (i.e., the amount of depression of the accelerator pedal), and transmit a corresponding signal to the vehicle controller 240.

Particularly, the position value of the accelerator pedal is 100% when the accelerator pedal is fully depressed or engaged, and the position value of the accelerator pedal is 0% when the accelerator pedal is disengaged. Notably, a throttle valve opening detector installed at a throttle valve may be equivalently used instead of the APS 221. Therefore, a throttle valve opening detector should be understood as an equivalent of an APS described in this example.

Furthermore, the engine speed sensor 223 may be configured to detect a rotation speed of the engine 110, more specifically, revolutions per minute (RPM) in this example. The engine speed sensor 223 may then be configured to provide the detected rotation speed of the engine 110 to the vehicle controller 240. The vehicle controller 240 may be configured to operate the engine 110 and the MHSG 130 based on the status data obtained by the data detection unit 200. In other words, the vehicle controller 240 may be configured to operate the engine 110 to generate a target engine torque for driving the mild hybrid vehicle based on the status data. The vehicle controller 240 may also be configured to operate the MHSG 130 to generate a target motor torque as an auxiliary toque to drive the mild hybrid vehicle based on the status data.

When restarting the engine 110, the vehicle controller 240 may be configured to operate the MHSG 130 by electricity supplied from the battery 140 to increase the rotation speed of the engine 110, and monitor the engine rotation speed of the engine 110. The vehicle controller 240 may be configured to receive the status data from the data detection unit 200, and determine an injection-starting rotation speed based on the status data. In other words, the vehicle controller 240 may be configured to determine the injection-starting rotation speed based on the coolant temperature, the temperature and the SOC of the battery 140, the temperature of the MHSG 130, the vehicle speed, the position value of the accelerator pedal, which are included in the status data. The injection-starting rotation speed refers to a rotation speed at which the engine 110 starts fuel injection.

The vehicle controller 240 may be configured to start fuel injection of the engine 110 when the engine rotation speed becomes greater than the injection-starting rotation speed. The vehicle controller 240 may be implemented as at least one microprocessor operating by a predetermined program, and the predetermined program may include instructions for executing a method for controlling starting of a mild hybrid vehicle according to an exemplary embodiment of the present invention. An operation of such a vehicle controller 240 will be described in further detail with reference to FIG. 3.

Hereinafter, a method for controlling starting of a mild hybrid vehicle is described in detail with reference to FIG. 3. FIG. 3 is a flowchart for a method for controlling starting of a mild hybrid vehicle according to an exemplary embodiment of the present invention.

Referring to FIG. 3, at step S310, the vehicle controller 240 may be configured to determine whether a starting-request signal is received. The vehicle controller 240 may be configured to receive the starting-request signal from a starting button (not shown) that may be physically operated by a driver. Alternatively, the vehicle controller 240 may be configured to receive a brake pedal off signal during an idle stop state and interpret the brake pedal off signal as the starting-request signal.

When the starting-request signal is not received, the vehicle controller 240 may be configured to maintain monitoring of receiving the starting-request signal by returning to the step S310. In other words, the vehicle controller 240 may be configured to continuously check for a starting-request signal. When the starting-request signal is received, the vehicle controller 240 may be configured to operate the MHSG 130 to increase the rotation speed of the engine 110, i.e., engine RPM, at step S315. In particular, the vehicle controller 240 may be configured to operate the battery 140 to supply electricity to the MHSG 130. Then, the MHSG 130 may be configured to operate the engine 110 by the electricity supplied from the battery 140, and accordingly, the engine speed of the engine 110 may be increased.

Then at step S320, the vehicle controller 240 may be configured to monitor the status data. In the data detection unit 200, the coolant temperature sensor 211 may be configured to detect a coolant temperature. The first temperature sensor 213 may be configured to detect the temperature of the battery 140. The SOC sensor may be configured to detect the SOC of the battery 140. Additionally, the second temperature sensor 217 may be configured to detect the temperature of the MHSG 130. The vehicle speed sensor 219 may be configured to detect the vehicle speed. The APS 221 may be configured to detect the position value of the accelerator pedal. The data detection unit 200 may be configured to transmit the detected status data to the vehicle controller 240. The vehicle controller 240 may be configured to receive the status data from data detection unit 200, and analyze the status data.

At step S325, the vehicle controller 240 may be configured to determine the engine rotation speed. In particular, the engine speed sensor 223 in the data detection unit 200 may be configured to detect the rotation speed of the engine 110 increased by the MHSG 130, and transmit the detection signal to the vehicle controller 240. Then the vehicle controller 240 may be configured to determine the engine rotation speed by receiving the detection signal from the engine speed sensor 223.

At step S330, the vehicle controller 240 may be configured to determine a reference rotation speed based on the coolant temperature, the temperature of the battery 140, and the SOC of the battery 140, which are included in the status data. Particularly, the vehicle controller 240 may access a predetermined power table. The predetermined power table may be a table in which available powers with respect to a plurality of temperatures of the battery 140 and SOCs of the battery 140 are stored. The vehicle controller 240 may be configured to retrieve an available power that corresponds with the temperature of the battery 140 and the SOC of the battery 140 from the predetermined power table.

Then, the vehicle controller 240 may access a predetermined control table. The predetermined control table may be a table in which engine rotation speeds with respect to a plurality of coolant temperatures and available powers of the battery 140 are stored. The vehicle controller 240 may be configured to retrieve the reference rotation speed that corresponds with the coolant temperature and the available power of the battery 140 from the predetermined control table.

At step 335, the vehicle controller 240 may be configured to determine a predetermined rotation speed based on the vehicle speed and the position value of the accelerator pedal that are included in the status data. In particular, vehicle controller 240 may access a predetermined speed table. The predetermined speed table may be a table in which engine rotation speeds with respect to a plurality of vehicle speeds and the position values of the accelerator pedal are stored. The vehicle controller 240 may be configured to retrieve the predetermined rotation speed that corresponds with the vehicle speed and the position value of the accelerator pedal from the predetermined speed table.

At step S340, the vehicle controller 240 may be configured to determine the injection-starting rotation speed based on the reference rotation speed, the temperature of the MHSG 130, and the predetermined rotation speed. In particular, the vehicle controller 240 may be configured to determine the injection-starting rotation speed using the equation 1 shown below.

$$RPM\_I = TH*F - S \quad \text{(equation 1)}$$

wherein, RPM_I indicates the injection-starting rotation speed, TH indicates the reference rotation speed, F indicates a temperature factor of the MHSG 130, and S indicates the predetermined rotation speed.

Notably, since the MHSG is generally of stronger power than a conventional starter motor, the reference rotation speed is set higher than conventional values set with respect to conventional starters. For example, the reference rotation speed may be set to be greater than or equal to an idle speed of the engine 110. In addition, the temperature factor F considers the performance of the MHSG based on the temperature of the MHSG, and may be set to be 1 for an optimized temperature and to be below 1 for higher or lower temperatures.

In addition, the predetermined rotation speed indicates an offset margin, and may be set to an appropriate value in consideration of design degree of freedom. For example, the predetermined rotation speed may be determined as a function of a vehicle speed and/or accelerator pedal depth, such that the RPM_I may decrease at higher speeds or under a hard acceleration (e.g., high engagement value of accelerator pedal).

At step S345, the vehicle controller 240 may be configured to determine whether the engine rotation speed has become greater than the injection-starting rotation speed. When the engine rotation speed is greater than the injection-starting rotation speed, the vehicle controller 240 may be configured to start fuel injection of the engine 110 at step S350. The vehicle controller 240 may be configured to operate an injector (not shown) of the engine 110 to inject fuel into a combustion chamber of the engine 110 when the engine rotation speed is greater than the injection-starting rotation speed.

At step S355, the vehicle controller 240 may be configured to determine a lapsed time when the engine rotation speed is less than the injection-starting rotation speed at the step S345. The lapsed time indicates a time period lapsed after receiving the starting-request signal. At step S360, the vehicle controller 240 may be configured to determine whether the lapsed time is greater than a predetermined time. Particularly, the predetermined time may be a reference time to determine whether increasing the engine rotation speed by the MHSG 130 greater than the injection-starting rotation speed is not available. In other words, an excessively long time period has lapsed from the starting-request signal, it may be understood that cranking the engine to sufficiently high speed by the MHSG 130 is not available. Such a predetermined time may be preset to a predetermined value or set to be calculated by a predetermined algorithm.

When the lapsed time is less than the predetermined time, the vehicle controller 240 may proceed to the step S355. When the lapsed time is greater than the predetermined time, the vehicle controller 240 may be configured to determine whether the engine rotation speed is within a reference range at step S365. In other words, at the step S365, the engine speed sensor 223 may be configured to determine the rotation speed of the engine 110 and provide or transmit the detected rotation speed to the vehicle controller 240. Then, the vehicle controller 240 may be configured to receive the engine rotation speed of the engine 110 supplied from the engine speed sensor 223.

Additionally, the vehicle controller 240 may be configured to determine whether the received engine rotation speed is within the reference range. In other words, the vehicle controller 240 may be configured to determine whether the engine rotation speed is within a range of a first rotation speed and a second rotation speed. The reference range may be preset as a criterion for determining whether fuel injection of the engine 110 is to be started. The first rotation speed and the second rotation speed may be different values and in particular, the first rotation speed may be greater than the second rotation speed.

At step S370, the vehicle controller 240 may be configured to start the fuel injection of the engine, when the engine rotation speed is within the reference range. Accordingly, when starting of the engine 110 by the MHSG 130 is not available, the fuel injection may be immediately executed to prevent failure of the starting of the engine. When the engine rotation speed is not within the reference range after the predetermined time has lapsed, vehicle controller 240 may be configured to stop the controlling of starting of the engine.

According to an apparatus for controlling starting of a mild hybrid vehicle according to an exemplary embodiment, to start or restart the engine, the MHSG 130 may be driven first to increase the rotation speed of the engine 110, and then the fuel injection of the engine 110 may be started when the engine rotation speed of the engine 110 becomes greater than the injection-starting rotation speed. Therefore, the timing of starting the fuel injection may be delayed during starting of the engine, thereby enhancing fuel economy.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

110: engine
120: transmission
130: MHSG
140: battery
150: differential gear apparatus
160: drive-wheel
200: data detection unit
240: vehicle controller

What is claimed is:

1. A method for controlling starting of a mild hybrid vehicle, comprising:
   receiving, by a controller, a starting-request signal;
   increasing, by the controller, a rotation speed of the engine by driving a mild hybrid starter-generator (MHSG) by electricity supplied from a battery, in response to receiving the starting-request signal;
   monitoring, by the controller, status data of the mild hybrid vehicle for controlling starting of the engine;
   obtaining, by the controller, an engine rotation speed from the status data;
   determining, by the controller, an injection-starting rotation speed based on the status data;
   determining, by the controller, whether the engine rotation speed is greater than the injection-starting rotation speed; and
   starting, by the controller, fuel injection of the engine when the engine rotation speed is greater than the injection-starting rotation speed,
   wherein determining the injection-starting rotation speed includes:
   determining, by the controller, a reference rotation speed based on a coolant temperature, a temperature of the battery, and a state of charge (SOC) of the battery;
   determining, by the controller, a predetermined rotation speed based on a vehicle speed and a position value of an accelerator pedal; and
   determining, by the controller, the injection-starting rotation speed based on the reference rotation speed, a temperature of the MHSG, and the predetermined rotation speed.

2. The method of claim 1, wherein the injection-starting rotation speed is determined using at least one of a coolant temperature, a temperature of the battery, a state of charge (SOC) of the battery, a temperature of the MHSG, a vehicle speed, and a position value of the accelerator pedal that are included in the status data.

3. The method of claim 1, wherein determining the reference rotation speed includes:
   retrieving, by the controller, an available power of the battery corresponding with the temperature of the battery and the SOC of the battery from a predetermined power table; and
   retrieving, by the controller, the reference rotation speed corresponding with the coolant temperature and the available power of the battery from a predetermined control table.

4. The method of claim 1, wherein the determining the predetermined rotation speed includes:
   retrieving, by the controller, the predetermined rotation speed corresponding with the vehicle speed and the position value of the accelerator pedal from a predetermined speed table.

5. The method of claim 1, wherein the injection-starting rotation speed is determined by an equation of RPM_I=TH*F−S, wherein RPM_I indicates the injection-starting rotation speed, TH indicates the reference rotation speed, F indicates a temperature factor of the MHSG, and S indicates the predetermined rotation speed.

6. The method of claim 1, further comprising:
   determining, by the controller, a lapsed time after receiving the starting-request signal, when the engine rotation speed is less than the injection-starting rotation speed;
   determining, by the controller, whether the lapsed time is greater than a predetermined time;
   determining, by the controller, whether the engine rotation speed is within a reference range, when the lapsed time is greater than a predetermined time; and
   starting, by the controller, fuel injection of the engine when the engine rotation speed is within the reference range.

7. A system for controlling starting of a mild hybrid vehicle, comprising:
   a vehicle controller configured to receive a start-request signal and in response, increase a rotation speed of an engine by driving a mild hybrid starter-generator (MHSG) by electricity supplied from a battery; and
   a data detection unit configured to detect status data to control starting of the mild hybrid vehicle,
   wherein the vehicle controller is further configured to:
   retrieve an available power of the battery corresponding with the temperature of the battery and the SOC of the battery from a predetermined power table; and
   retrieve the reference rotation speed corresponding with the coolant temperature and the available power of the battery from a predetermined control table,
   wherein the vehicle controller is configured to,
   monitor the status data of the mild hybrid vehicle detected by the data detection unit,
   obtain an engine rotation speed from the status data;
   determine an injection-starting rotation speed based on the status data;
   determine whether the engine rotation speed is greater then the injection-starting rotation speed; and
   start fuel injection of the engine when the engine rotation speed is greater than the injection-starting rotation speed.

8. The system of claim 7, wherein the data detection unit includes a coolant temperature sensor, a first temperature sensor, a state-of-charge (SOC) sensor, a second temperature sensor, a vehicle speed sensor, an accelerator pedal position sensor (APS), and an engine speed sensor.

9. The system of claim 7, wherein the vehicle controller is further configured to:
   determine a reference rotation speed based on a coolant temperature, a temperature of the battery, and a state of charge (SOC) of the battery;
   determine a predetermined rotation speed based on a vehicle speed and a position value of an accelerator pedal; and
   determine the injection-starting rotation speed based on the reference rotation speed, a temperature of the MHSG, and the predetermined rotation speed.

10. The system of claim 7, wherein the vehicle controller is further configured to:
   determine a lapsed time after receiving the starting-request signal, when the engine rotation speed is less than the injection-starting rotation speed;
   determine whether the lapsed time is greater than a predetermined time;
   determine whether the engine rotation speed is within a reference range, when the lapsed time is greater than a predetermined time; and
   start fuel injection of the engine when the engine rotation speed is within the reference range.

* * * * *